United States Patent [19]

Larson

[11] 4,282,192
[45] Aug. 4, 1981

[54] PROCESS FOR PRODUCING A CALCIUM SULFATE PRODUCT CONTAINING LOW AMOUNTS OF RADIUM

[75] Inventor: Harold V. Larson, Houston, Tex.

[73] Assignee: Olin Corporation, New Haven, Conn.

[21] Appl. No.: 125,007

[22] Filed: Feb. 27, 1980

[51] Int. Cl.$^3$ .................... C01B 25/16; C01F 11/46; C01F 13/00

[52] U.S. Cl. ........................................ 423/166; 423/2; 423/167; 423/249; 423/319; 423/321 R; 423/555

[58] Field of Search ............... 423/162, 166, 167, 170, 423/171, 172, 555, 319, 321 R, 2, 249

[56] References Cited

U.S. PATENT DOCUMENTS

| | | | |
|---|---|---|---|
| 2,531,977 | 11/1950 | Hammaren et al. | 423/167 |
| 3,003,852 | 10/1961 | Nordengrew | 423/319 |
| 3,306,702 | 2/1967 | Odland et al. | 423/321 |
| 3,418,077 | 12/1968 | Robinson | 423/319 |
| 3,792,151 | 2/1974 | Case | 423/166 |
| 3,796,790 | 3/1974 | Sirianni et al. | 423/166 |
| 3,840,639 | 10/1974 | Drechsel | 423/167 |
| 3,949,047 | 4/1976 | Cherdron et al. | 423/167 |
| 3,951,675 | 4/1976 | Krempff | 423/167 |
| 4,029,743 | 6/1977 | Hauge | 423/167 |
| 4,146,568 | 3/1979 | Lange, Jr. | 423/170 |

FOREIGN PATENT DOCUMENTS

| | | | |
|---|---|---|---|
| 605246 | 9/1960 | Canada | 423/321 R |
| 637832 | 3/1962 | Canada | 423/321 R |

OTHER PUBLICATIONS

Sneed et al., Comprehensive Inorganic Chemistry, D. Van Nostrand Co. Inc., N.Y., N.Y., 1953, pp. 131-132.
Kirk et al., Encyclopedia of Chemical Technology, 1st Edition, vol. 11, The Interscience Encyclopedia Inc., N.Y., N.Y., p. 469.

*Primary Examiner*—Gary P. Straub
*Attorney, Agent, or Firm*—William A. Simons; Thomas P. O'Day

[57] ABSTRACT

Disclosed is a process for producing a calcium sulfate product containing low amounts of radium comprising the steps of:
(a) adding at least one sequestering agent to a substantially homogeneous radium-containing monocalcium phosphate (MCP) solution, the amount of the sequestering agent added being at least the stoichiometric amount necessary to complex with the radium in the MCP solution;
(b) reacting the treated MCP solution with $H_2SO_4$ to form a monocalcium phosphate/phosphoric acid solution, to precipitate a first calcium sulfate product, and to precipitate at least a portion of the radium, the amount of said $H_2SO_4$ being up to about 50% of the stoichiometric amount necessary to react with the total $CA^{++}$ present in the MCP solution;
(c) separating the monocalcium phosphate/phosphoric acid solution from the radium-containing calcium sulfate precipitate;
(d) then reacting the monocalcium phosphate/phosphoric acid solution with $H_2SO_4$ to form a phosphoric acid solution and to precipitate a second calcium sulfate product, the amount of the $H_2SO_4$ added being at least sufficient to react with substantially all of the $CA^{++}$ present in the monocalcium phosphate/phosphoric acid solution; and
(e) separating the phosphoric acid from the second calcium sulfate product.

5 Claims, 1 Drawing Figure

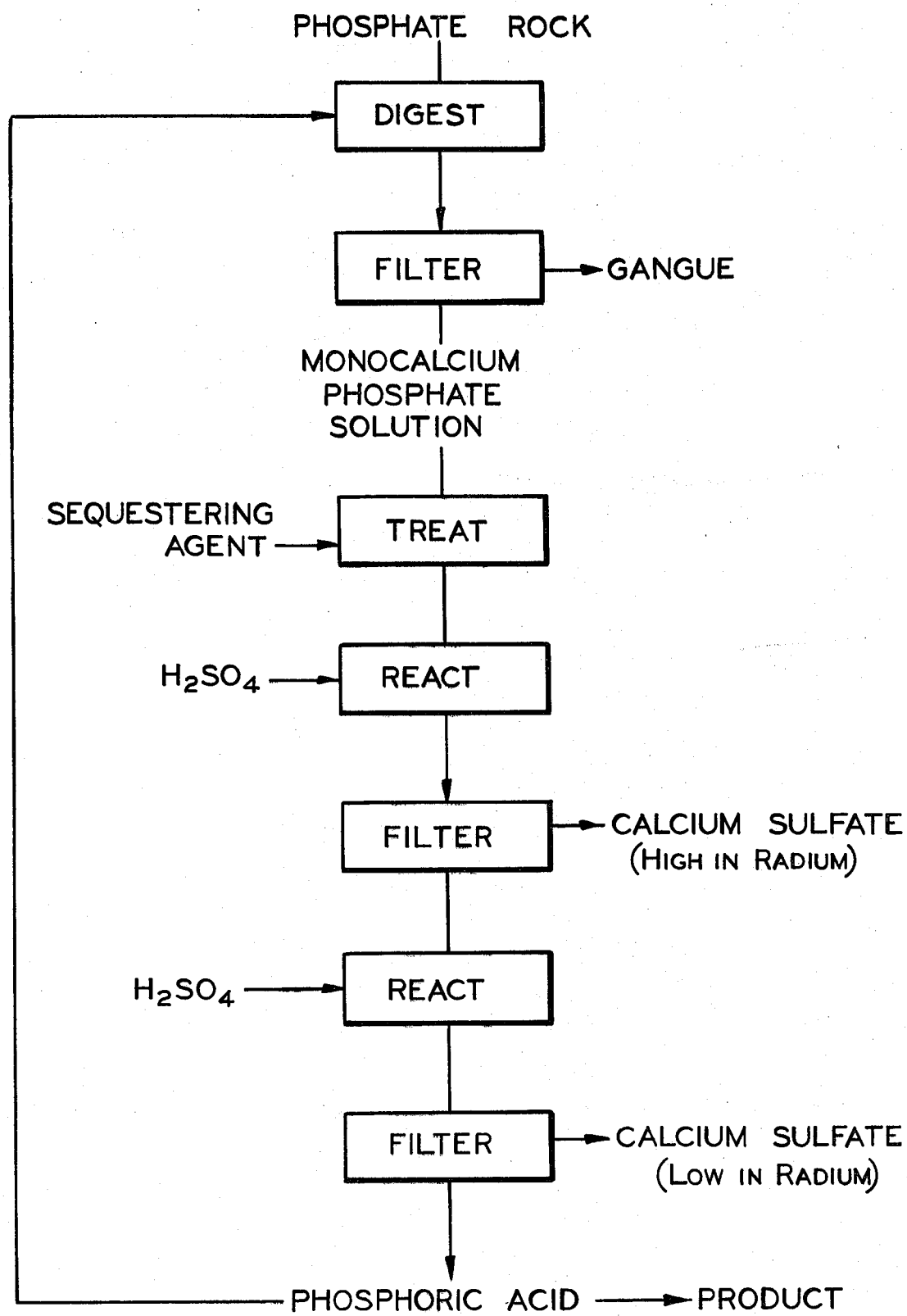

PROCESS FOR PRODUCING A CALCIUM SULFATE PRODUCT CONTAINING LOW AMOUNTS OF RADIUM

FIELD OF THE INVENTION

The present invention relates to a process for proding a phosphoric acid solution and a calcium sulfate product containing low amounts of radium from radium-containing phosphate rock. In particular, the present invention relates to a process for producing a calcium sulfate product containing low amounts of radium through the use of a sequestering agent to complex with the radium followed by the precipitation and removal of that complex.

DESCRIPTION OF THE PRIOR ART

Numerous prior art references describe many different wet processes for simultaneously producing both phosphoric acid solutions and calcium sulfate products (either the anhydrite form—$CaSO_4$ with no water of hydration; the hemihydrate form—$CaSO_4 \cdot \frac{1}{2}H_2O$; or the dihydrate form or gypsum—$CaSO_4 \cdot 2H_2O$). One generally disclosed type of process is to, first, digest phosphate rock with either recycled phosphoric acid, a recycled monocalcium phosphate (MCP) solution, or mixtures of both in order to form a monocalcium phosphate solution containing undigested gangue material (e.g., impurities such as Fe, Al, F and Si); second, separating the gangue from the MCP solution; third, reacting the clarified solution with sulfuric acid to simultaneously form a phosphoric acid solution and a solid calcium sulfate product; and, fourth, separating the phosphoric acid solution from the calcium sulfate product. As examples of this general type of process, see U.S. Pat. Nos. 2,531,977; 3,003,852; 3,418,077; 3,792,151; 3,840,639; 3,949,047 and 4,029,743. The milder rock digestion with $H_3PO_4$ or a MCP solution (rather than $H_2SO_4$) allows for a relatively large portion of the undesirable impurities like Fe, Al, F and Si in the phosphate rock to be easily removed in the gangue.

However, the prior art references mentioned above were not generally concerned with the presence of radioactive impurities such as radium in the phosphate rock and usually did not teach any specific steps for their removal. Only U.S. Pat. No. 3,949,047, which issued to Cherdron et al on Apr. 6, 1976, specifically teaches a method for removing radium contaminants from a mono-calcium phosphate solution. That method includes the addition of a soluble barium compound in the presence of sulfate ions to precipitate radium ions as radium sulfate. However, the use of barium compounds in large-scale commercial phosphoric acid plants seems prohibited by their relatively high cost.

The radium originating from the phosphate rock, if not removed, will usually end up in the calcium sulfate products made by the above-mentioned processes. In the past, these calcium sulfate products were generally discarded as unwanted by-products because of the presence of impurities contained therein. Large piles of this material can be found at some phosphoric acid plants. Moreover, the presence of radium in these calcium sulfate wastes has increasingly become the concern of governmental regulatory agencies and the industry itself. It is possible that these calcium sulfate wastes may become classified as hazardous materials if they have too high radium levels. Furthermore, the slight radioactivity which radium imparts to these calcium sulfate products poses a possible obstacle to their use in construction items such as wallboard, even when the radioactivity levels are minute.

Accordingly, there is a need in the art for an effective and economic means for removing at least a portion of the radium that originates in phosphate rock. Furthermore, there is a need in the art for making calcium sulfate products which have acceptable levels of radium so they may be utilized in construction items. The process of the present invention offers a solution to those needs.

BRIEF SUMMARY OF THE INVENTION

The present invention is, therefore, directed to a process for producing a calcium sulfate product containing low amounts of radium comprising the steps of:

(a) adding at least one sequestering agent to a substantially homogeneous radium-containing monocalcium phosphate (MCP) solution, the amount of the sequestering agent added being at least the stoichiometric amount necessary to complex with the radium in the MCP solution;

(b) then reacting the solution with $H_2SO_4$ to form a monocalcium phosphate/phosphoric acid solution, to precipitate a first calcium sulfate product, and to precipitate at least a portion of the radium, the amount of said $H_2SO_4$ employed with this reaction being up to about 50% of the stoichiometric amount necessary to react with the total $Ca^{++}$ present in the MCP solution;

(c) separating the monocalcium phosphate/phosphoric acid solution from the radium-containing calcium sulfate precipitate;

(d) then reacting the monocalcium phosphate/phosphoric acid solution with $H_2SO_4$ to form a phosphoric acid solution and to precipitate a second calcium sulfate product, the amount of the $H_2SO_4$ added being at least sufficient to react with substantially all of the $Ca^{++}$ present in the monocalcium phosphate/phosphoric acid solution in forming calcium sulfate; and (e) separating the phosphoric acid from the second calcium sulfate product.

The second calcium sulfate product contains relatively low amounts of radium since at least a portion of the radium is removed with the first calcium sulfate product. Thus, this second calcium sulfate product may be acceptable for use in construction materials such as cement or wallboard. Also, the process of the present invention aids in preventing the second calcium sulfate product from becoming a hazardous material.

BRIEF DESCRIPTION OF THE DRAWING

The FIGURE is a diagrammatic flow chart illustrating one preferred method of the present invention.

DETAILED DESCRIPTION

The process of the present invention is based on the theory that radium in MCP solutions, if untreated, acts as small particles rather than dissolved ions in solution. This theory finds support in previous observations by others that some radioisotopes (e.g., those of Pb and Bi) might act as "radiocolloids" or small particles in some solutions. See Kirk and Othmer, *Encyclopedia of Chemical Technology*, (First Edition, Vol. 11, page 469) and Sneed, "Maynard and Brasted, *Comprehensive Inorganic Chemistry*, (pages 131–132).

In the present invention, the addition of a sequestering agent is thought to cause the radium to form soluble complexes in MCP solutions. Evidently, when the radioactive isotopes are complexed, they cease to behave as particles. Instead, it is thought that the radium would then be acting as an ion. When the first addition of $H_2SO_4$ occurs, it is also thought that the complex is suddenly broken and the radium ions are quickly precipitated with the first calcium sulfate product. The addition of a sequestering agent seems to cause the concentration of the radioactivity in the first calcium sulfate product rather than both calcium sulfate products produced by this process. However, the exact reason for this seemingly fast precipitation is not known.

The term "monocalcium phosphate solution" as employed herein refers to any conventionally employed MCP solution from which phosphoric acid solutions and calcium sulfate products can be made. The MCP solutions covered herein are not limited to any particular CaO or $P_2O_5$ levels and such parameters are not critical limitations of the present invention. This term also covers any or all mixtures of MCP and phosphoric acid as commonly used in the phosphoric acid art to make phosphoric acid and calcium sulfate.

The term "substantially homogeneous" as employed herein as an adjactive to MCP solutions refers to those solutions which have had the gangue and any other insoluble material substantially all removed (i.e., over about 95% by weight, preferably, at least about 98% by weight, insolubles removed). In particular, these above two defined terms preferably refer herein to any substantially homogeneous radium-containing MCP solution made by digesting radium-containing phosphate rock with any solution comprising phosphoric acid, monocalcium phosphate, or mixtures thereof, and then removing substantially all of the gangue and other insoluble material therefrom. The present invention is not limited to any particular process limitations for making such substantially homogeneous MCP solutions and any and all conventionally employed process parameters may be used.

The term "sequestering agent" as employed herein refers to any sequestering agent capable of combining with radium to produce soluble complexes. Of course, sequestering agents must be considered in relation to the solvent system to which they are applied. In the present instance, suitable sequestering agents are those which form soluble complexes with radium in a MCP solution, but will dissociate from the radium upon a lowering of the pH of the solution (i.e., when $H_2SO_4$ is added).

One preferred class of sequestering agents useful in this invention are unsubstituted and inertly substituted amino derivatives of carboxylic acids and salts thereof. These compounds may be either aliphatic or aromatic in structure and may contain either one amino group or may have two or more amino groups, as more fully described below. The inert substitutents which may be part of these compounds include any substitutent which does not interfere with the formation of soluble complexes with radium and the formation of calcium sulfate products by the process of the present invention.

These amino derivatives of carboxylic acids and salts thereof include those of the general formula:

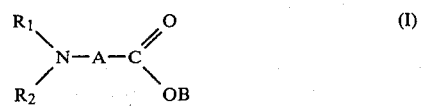

wherein A is a branched or straight chain alkylene biradical having about 1 to about 10 carbon atoms; B is hydrogen or any suitable cation, e.g., metal ion such as Na or ammonium or hydrazinium, which is capable of being replaced by radium; and $R_1$ and $R_2$ are each independently selected from the group consisting of hydrogen, lower alkyls, aryls, the radical:

wherein A and B are defined above, and the radical:

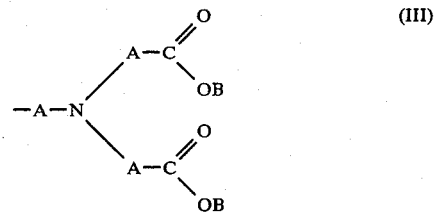

wherein each A and B are independently selected from the groups defined for A and B above, respectively.

Desirably, the sequestering agent of the present invention is one having the structure of Formula (I) above wherein A has 1 to 4 carbon atoms; $R_1$ and $R_2$ are each independently selected from the group consisting of hydrogen, alkyls having 1 to 10 carbon atoms, aryls having 6 to 14 carbon atoms and the radicals of Formulas (II) and (III) above wherein A has 1 to 4 carbon atoms. Preferably, the sequestering agent is one having the structure of Formula (I) above wherein A has 1 to 3carbon atoms and $R_1$ and $R_2$ are each independently selected from the group consisting of hydrogen, alkyls having 1 to 4 carbon atoms and the radicals of Formulas (II) and (III) above wherein A has 1 to 3 carbon atoms.

The most preferred sequestering agent is N,N,N',N'-ethylene-diamine tetraacetic acid (EDTA) and its salts, having the formula:

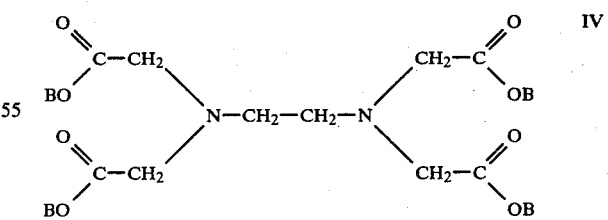

Other illustrative sequestering agents include acids and salts based on ethylene diamine, trimethylene diamine or diethylene triamine. Of course, other suitable sequestering agents could be easily found by routine experimentation.

Referring to the preferred process shown by the FIGURE, phosphate rock is first introduced into a digester where the rock is dissolved in an excess of phosphoric acid to form a monocalcium phosphate solution and insoluble gangue material. Alternatively, recycled monocalcium phosphate solution may be used instead, or in combination with phosphoric acid to digest the rock. Any conventional means of digesting rock into a MCP solution may be employed.

Any radium-containing and calcium-containing phosphate rock which is conventionally used to make wet process phosphoric acid may be utilized herein. The rock may have any particle size, any $P_2O_5$ content, any other mineral, and any impurities which have conventionally been acceptable in the past for this type of process. The only parameter of the rock which is considered a critical part of the present invention is that it must contain a level of radium impurities therein which may make the calcium sulfate products from it have unacceptably high radium concentrations.

After the digestion step, the effluent of the digester is then passed to a classifier or filter where substantially all of the gangue and other insoluble material is separated from the monocalcium phosphate solution. Instead of a classifier or filter, any suitable separating device may be used for this purpose. It should be noted that conventional gangue separation steps (e.g., coarse filtration) used in large-scale wet process phosphoric acid plants will not remove substantial amounts of the small radium particles from the MCP solutions. After separation, the gangue may be water-washed to remove any soluble phosphate adhering thereto, and the water-washings may be either recycled to the digester or recombined with the substantially homogeneous MCP solution. The water-washed gangue may be disposed of or further processed to recover metal (e.g., Fe or Al) values, silicon values, fluorine values or other rock component values.

After the gangue separation step, the resulting substantially homogeneous MCP solution is treated with at least one sequestering agent to form soluble complexes with at least a portion of the radium. Generally, the desired amount of sequestering agent added is at least the stoichiometric amount necessary to form soluble complexes with the radium. More preferably, it may be desirable to use from about 0.1 to about 100 parts by weight of sequestering agent per million parts of MCP solution. Such amounts of sequestering agents would generally exceed the stoichiometric requirements for complexing with radium impurities, but may be desired if other undesirable metal ions are also present and could interfere with the formation of radium complexes. Also, combinations of sequestering agents may be employed.

After the sequestering agents have had time to form soluble complexes of radium in the MCP solution, a limited amount of sulfuric acid may be added to the solution. Generally, the amount of $H_2SO_4$ that can be added at this stage is limited to only about 50%, desirably from about 10% to 40%, of the stoichiometric amount necessary to react with the $Ca^{++}$ in the MCP solution to form calcium sulfate. The use of substantially more than 50% would interfere with the yield of the second calcium sulfate product which is low in radium content. The use of less than about 5% may not be sufficient in some instances to break the complex and cause precipitation.

The addition of $H_2SO_4$ to the MCP solution has several immediate effects. One, the $SO_4$ ions in the acid reacts with Ca ions of the MCP solution to form a calcium sulfate product. By the usual control of the concentration and temperature conditions, the calcium sulfate product will be recovered as the dihydrate, hemihydrate or the anhydrate, as desired. Normally, this calcium sulfate product will precipitate from the solution. Two, the removal of a portion of the calcium from the MCP solution results in a mixture of monocalcium phosphate and phosphoric acid in the solution being formed. If the MCP solution originally contained some phosphoric acid, then the phosphoric acid content would increase. Three, the decrease in pH of the solution upon $H_2SO_4$ addition is thought to cause the soluble complex of radium and sequestering agent to break apart. In any event, at least a portion of the radium precipitates immediately with the first calcium sulfate product.

After this $H_2SO_4$ reaction is complete, the radium and calcium sulfate precipitates are separated from the monocalcium phosphate/phosphoric acid solution. Any conventional means of separation such as filtration may be employed.

Following separation, the clarified solution is reacted with more $H_2SO_4$ in order to precipitate a second calcium sulfate product. Like the first, this product may be made in the dihydrate, hemihydrate or anhydrate form. The amount of $H_2SO_4$ added should be sufficient to react with the Ca ions in the solution, but, desirably, should not be so great that a great excess of $SO_4$ ion remains in the resulting phosphoric acid solution. Alternatively, the present invention also contemplates the formation of more than one low radium-containing calcium sulfate product. This could be accomplished by adding more than one increment of $H_2SO_4$ to the clarified MCP/phosphoric acid solution. It is believed that the $CaSO_4$ products produced in the third stage and subsequent stages would contain even less radium than the product of the second stage.

The second calcium sulfate product will be relatively lower in radium content than normal products made by conventional processes. Furthermore, it is characterized by a high degree of whiteness and will contain relatively little chemical impurities which may make it attractive for use as construction items.

The phosphoric acid solution produced by this process is also suitable for a variety of uses. A portion of that solution, as shown in the FIGURE, is preferably recycled back to the rock digester. If a portion of phosphoric acid product is recycled, it may be desirable to also recycle a sufficient portion of the substantially homogeneous MCP solution to neutralize any $SO_4$ ion content present in the phosphoric acid.

The following examples further illustrate the present invention. All parts and percentages are by weight unless otherwise explicitly stated. All gamma counts were conducted with Scintillation Spectrometer four (4) months after the samples were formed. This wait was necessary since the radioactivity of the samples increased slightly with time, reaching a final value after about three weeks of aging. It is believed that radioactive "daughter" (e.g., $Pb^{214}$ and $Bi^{214}$) compounds reach an equilibrium concentration at that time. Gamma results given are gross gamma results based on all gamma counts from 0.032 to 2.53 MEV.

EXAMPLE 1

This first Example illustrates the typical amounts of radioactivity and the relative particle sizes of radioactive materials that can be found in MCP solutions which have not yet been treated by the present invention.

A clarified monocalcium phosphate solution (200 cc) was prepared by (1) digesting 70 BPL Florida phosphate rock with a phosphoric acid solution and (2) then removing the gangue by filtration through a 24 cm Buchner funnel containing No. 4 Whatman filter paper. This substantially homogeneous MCP solution was next filtered through several Metricel filters of various pore sizes. A screen analysis of the solids contained in the MCP solution was thus obtained, and the separated fractions were each counted for gamma activity on a Gamma Scintillation Spectrometer. It was determined separately that radium was the principal component of the radioactive materials. The results are tabulated below in Table 1.

TABLE 1

Solids Present in MCP Solution and Their Radioactivity

| Particle Size | Weight | Weight % | Activity | Total Activity |
|---|---|---|---|---|
| +5 microns | 0.7354 gm | 85.2% | 575 pCi/gm | 423 pCi |
| −5 + 1.2 microns | 0.0253 | 2.9 | 3,393 | 86 |
| −1.2 + 0.8 microns | 0.0445 | 5.2 | 660 | 30 |
| −0.8 + 0.45 microns | 0.0268 | 3.1 | 1,540 | 41 |
| −0.45 + 0.2 microns | 0.0311 | 3.6 | 2,070 | 64 |
| | 0.8363 | 100.0 | | 644 |

Furthermore, the MCP solution which passed completely through the Metricel filters was converted into two phosphoric acid and gypsum batches. These gypsum batches were also counted for gamma activity, which counted 3.167 and 3.091 pCi/gm, respectively.

This 200 cc of MCP from which these solids were removed would have produced about 18 grams of gypsum if reacted with sufficient $H_2SO_4$. The 644 pCi of activity trapped on the Metricel filters would thus have given a gypsum with an activity of 644/18=35.8 pCi/gm. Thus, about 80–90% the total activity in the MCP solution was in the form of particles larger than 0.2 microns.

EXAMPLE 2

A clarified (i.e., substantially homogeneous) monocalcium phosphate solution was prepared by digesting 70 BPL Florida phosphate rock with phosphoric acid and then filtering the gangue from the solution through No. 4 Whatman filter paper. 200 cc of this MCP solution (containing 2.5% CaO and 22% $P_2O_5$) was treated with sufficient N,N,N′,N′-ethylenediamine tetraacetic acid (EDTA) to result in a MCP solution having 30 ppm. Then, half the stoichiometric $H_2SO_4$ required to form gypsum was added as 98% $H_2SO_4$. The gypsum thus formed was filtered off using No. 4 Whatman filter paper, and had an activity of 114.632 pCi/gm. Then, the balance of the stoichiometric $H_2SO_4$ was added to the filtrate, and the second batch of gypsum formed was also filtered off over a No. 4 Whatman paper. This second batch had a measured radioactivity count of only 1.655 pCi/gm.

COMPARISON

A control test was measured with 200 cc of the same MCP solution. This MCP solution was not treated with EDTA, but was reacted with $H_2SO_4$ and filtered in the same two-stage fashion. The two gypsum batches produced 58.3 pCi/gm and 23.1 pCi/gm, respectively.

The results of the above Example and Comparison, when compared, illustrate that radioactivity in a MCP solution may be sequestered to behave as a dissolved compound and then be more effectively precipitated with the first $H_2SO_4$ addition in the first gypsum batch. The second gypsum batch thereafter produced by the present invention is nearly free of radioactivity and, thus, may be useful in building materials such as wallboard.

What is claimed is:

1. A process for producing a calcium sulfate product having low amounts of radium comprising the steps of:
   (a) adding at least one sequestering agent to a substantially homogeneous radium-containing monocalcium phosphate solution, the amount of said sequestering agent added being at least the stoichiometric amount necessary to complex with said radium in said solution;
   (b) then reacting said solution with sufficient sulfuric acid to form a monocalcium phosphate/phosphoric acid solution, to precipitate a first calcium sulfate product and to precipitate at least a portion of said radium, the amount of said sulfuric acid added being from about 5% up to about 50% of the stoichiometric amount necessary to react with the total $Ca^{++}$ present in said monocalcium phosphate solution in forming calcium sulfate;
   (c) separating said resulting monocalcium phosphate/phosphoric acid solution from said first radium-containing calcium sulfate precipitate;
   (d) then reacting the monocalcium phosphate/phosphoric acid solution with sufficient sulfuric acid to form a phosphoric acid solution and to precipitate a second calcium sulfate product, the amount of sulfuric acid being at least sufficient to react with substantially all of the $Ca^{++}$ present in said monocalcium phosphate/phosphoric acid solution in forming calcium sulfate; and
   (e) separating the phosphoric acid solution from the second calcium sulfate product, said second calcium sulfate product having a lower radium concentration than said first calcium sulfate product.

2. The process of claim 1 wherein at least a major portion of said radium is precipitated in step (b).

3. The process of claim 1 wherein said sequestering agent is selected from the group consisting of unsubstituted and inertly substituted amino derivatives of carboxylic acids and salts thereof.

4. The process of claim 1 wherein from about 0.1 to about 100 parts of sequestering agent per million parts by weight of monocalcium phosphate solution is employed.

5. The process of claim 1 wherein said sequestering agent is EDTA.

* * * * *

UNITED STATES PATENT AND TRADEMARK OFFICE
CERTIFICATE OF CORRECTION

PATENT NO. : 4,282,192
DATED : August 4, 1981
INVENTOR(S) : Harold V. Larson

It is certified that error appears in the above-identified patent and that said Letters Patent are hereby corrected as shown below:

On Title page in "[73] Assignee: second line after "Olin Corporation, New Haven, Conn." please insert --and United States Gypsum Company, Chicago, Ill.--

Signed and Sealed this

Ninth Day of February 1982

[SEAL]

Attest:

*Attesting Officer*

GERALD J. MOSSINGHOFF

*Commissioner of Patents and Trademarks*